United States Patent
Yun et al.

(10) Patent No.: US 11,262,117 B2
(45) Date of Patent: Mar. 1, 2022

(54) REFRIGERATOR

(71) Applicant: LG Electronics Inc., Seoul (KR)

(72) Inventors: Seokjun Yun, Seoul (KR); Changho Seo, Seoul (KR); Younghoon Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 134 days.

(21) Appl. No.: 16/487,729

(22) PCT Filed: Jan. 2, 2018

(86) PCT No.: PCT/KR2018/000006
§ 371 (c)(1),
(2) Date: Aug. 21, 2019

(87) PCT Pub. No.: WO2018/155805
PCT Pub. Date: Aug. 30, 2018

(65) Prior Publication Data
US 2020/0011583 A1    Jan. 9, 2020

(30) Foreign Application Priority Data
Feb. 21, 2017   (KR) .................. 10-2017-0023103

(51) Int. Cl.
*F25D 11/02*   (2006.01)
*F25D 11/00*   (2006.01)
(Continued)

(52) U.S. Cl.
CPC .......... *F25D 11/025* (2013.01); *F25D 11/006* (2013.01); *F25D 19/006* (2013.01);
(Continued)

(58) Field of Classification Search
CPC .... F25D 11/025; F25D 11/006; F25D 19/006; F25D 23/006; F25D 2303/083;
(Continued)

(56) References Cited

U.S. PATENT DOCUMENTS 2,780,925 A * 2/1957 Mcgrew ................. F25D 21/06
  62/154
4,485,639 A * 12/1984 Sakamoto .............. F25D 21/04
  165/104.21
(Continued)

FOREIGN PATENT DOCUMENTS

CN       202126133       1/2021
EP         2549210       1/2013
(Continued)

OTHER PUBLICATIONS

Extended European Search Report in European Application No. 18758472.7, dated Oct. 29, 2020, 5 pages.
(Continued)

*Primary Examiner* — Kun Kai Ma
(74) *Attorney, Agent, or Firm* — Fish & Richardson P.C.

(57) ABSTRACT

A refrigerator includes a cabinet, a first inner case that defines a freezing compartment, a second inner case that defines a refrigerating compartment, a thermal siphon unit that is configured to carry a working fluid for heat transfer and that has a closed loop shape that includes a first part arranged at an outer side of the first inner case and a second part arranged at an outer side of the second inner case, and a cool air storage unit arranged in a space partitioned in the first inner case. The cool air storage unit is configured to accommodate cool air of the freezing compartment and transfer the cool air to the first part of the thermal siphon unit arranged outside of the first inner case.

19 Claims, 11 Drawing Sheets

(51) Int. Cl.
  *F25D 19/00* (2006.01)
  *F25D 23/00* (2006.01)
  *F25D 23/06* (2006.01)
  *F28D 20/02* (2006.01)
(52) U.S. Cl.
  CPC ......... *F25D 23/006* (2013.01); *F25D 23/061* (2013.01); *F25D 23/065* (2013.01); *F28D 20/023* (2013.01); *F25D 2303/083* (2013.01); *F25D 2303/085* (2013.01)
(58) Field of Classification Search
  CPC .......... F25D 2303/085; F25D 2303/08; F25D 16/00; F25D 3/005; F28D 20/023; F28D 2020/0008
  See application file for complete search history.

(56) References Cited

U.S. PATENT DOCUMENTS

| | | | | |
|---|---|---|---|---|
| 4,732,009 | A * | 3/1988 | Frohbieter | F25D 17/065 62/187 |
| 5,048,306 | A * | 9/1991 | Wakatsuki | F25D 17/045 62/419 |
| 5,081,850 | A * | 1/1992 | Wakatsuki | F25D 17/08 62/405 |
| 5,709,945 | A | 1/1998 | Lee et al. | |
| 6,308,518 | B1 * | 10/2001 | Hunter | G05D 16/0655 62/3.3 |
| 2008/0202149 | A1 * | 8/2008 | Lim | F25D 17/067 62/407 |
| 2009/0313520 | A1 | 12/2009 | Chung et al. | |
| 2012/0181911 | A1 * | 7/2012 | Kim | A61L 2/14 312/405 |
| 2013/0019623 | A1 * | 1/2013 | Jo | F28D 15/0266 62/190 |
| 2013/0152621 | A1 * | 6/2013 | Lee | F25D 11/025 62/441 |
| 2013/0160476 | A1 * | 6/2013 | Lee | F25D 16/00 62/291 |
| 2014/0372826 | A1 | 12/2014 | Myung et al. | |
| 2016/0047591 | A1 * | 2/2016 | Jeong | F25D 11/00 62/344 |
| 2017/0205131 | A1 * | 7/2017 | Yun | F25D 29/006 |
| 2017/0328611 | A1 * | 11/2017 | Tao | F25D 16/00 |
| 2020/0011583 | A1 * | 1/2020 | Yun | F25D 23/061 |

FOREIGN PATENT DOCUMENTS

| | | |
|---|---|---|
| EP | 2604957 | 6/2013 |
| KR | 100676971 | 2/2007 |
| KR | 1020130011276 | 1/2013 |
| KR | 1020140124222 | 10/2014 |
| KR | 101458199 | 11/2014 |

OTHER PUBLICATIONS

CN Office Action in Chinese Appln. No. 201880012281.9, dated Mar. 16, 2021, 15 pages (with English translation).

IN Office Action in Indian Appln. No. 201927036104, dated Mar. 25, 2021, 7 pages (with English translation).

* cited by examiner

| Classification | Existing case (average) | Gap |
|---|---|---|
| Null-additive | -2.13°C | 0°C |
| 0.5% additive | -2.08°C | 0.05°C |
| 0.8% additive | -2.01°C | 0.12°C |
| 1.0% additive | -2.23°C | -0.10°C |
| 1.5% additive | -2.31°C | -0.18°C |
| 2.0% additive | -2.25°C | -0.12°C |
| 4.0% additive | -2.27°C | -0.14°C |

REFRIGERATOR

CROSS-REFERENCE TO RELATED APPLICATIONS

This application is a National Stage application under 35 U.S.C. § 371 of International Application No. PCT/KR2018/000006, filed on Jan. 2, 2018, which claims the benefit of Korean Application No. 10-2017-0023103, filed on Feb. 21, 2017. The disclosures of the prior applications are incorporated by reference in their entirety.

TECHNICAL FIELD

The present disclosure relates to a refrigerator, and more particularly, to a refrigerator that may maintain a low temperature of a refrigerating compartment even in case of power failure.

BACKGROUND

A refrigerator is a home appliance that may store and keep food in a refrigerated or frozen state by driving a cooling cycle for cooling an inside of the refrigerator. The cooling cycle may include a compressor, a condenser, an expansion device, and an evaporator that are connected to one another through a refrigerant pipe that defines a circulation loop. The compressor and the condenser may be mounted in a mechanical compartment disposed at the lower side of the refrigerator, and the evaporator may be disposed at the rear side of a freezing compartment or a refrigerating compartment.

In some cases, a refrigerator may maintain, when a power is normally supplied to the refrigerator to normally operate the compressor, a constant internal temperature by supplying cool air generated in the evaporator into the refrigerator through a fan. In some cases, if a power failure or a compressor failure occurs during the cooling cycle, the cooling cycle may stop and the internal temperature of the refrigerator may increase.

It is of interest to maintain a low temperature of a refrigerating compartment for a long time to prevent food from going bad even in case of a power failure.

SUMMARY

This application describes a refrigerator that can maintain a refrigerating compartment at a temperature lower than the external air at a power failure state that electricity is not supplied thereto.

According to one aspect of the subject matter described in this application, a refrigerator include: a cabinet; a first inner case that defines a freezing compartment; a second inner case that defines a refrigerating compartment; a thermal siphon unit configured to carry a working fluid for heat transfer, in which the thermal siphon unit has a closed loop shape that includes a first part arranged at an outer side of the first inner case and a second part arranged at an outer side of the second inner case; and a cool air storage unit arranged in a space partitioned in the first inner case. The cool air storage unit is configured to accommodate cool air of the freezing compartment and transfer the cool air to the first part of the thermal siphon unit arranged outside of the first inner case.

Implementations according to this aspect may include one or more of the following features. For example, the cool air storage unit may be disposed at a ceiling of the freezing compartment and have one surface exposed to an inner space of the freezing compartment. In some implementations, the thermal siphon unit may include: a condensing pipe configured to condense the working fluid by the cool air in the freezing compartment; an evaporator pipe configured to evaporate the working fluid by absorbing heat from cool air in the refrigerating compartment; a first connection pipe that connects an outlet of the evaporator pipe to an inlet of the condensing pipe and that is configured to communicate the working fluid evaporated by the evaporator pipe to the condensing pipe; and a second connection pipe that connects an outlet of the condensing pipe to an inlet of the evaporator pipe and that is configured to communicate the working fluid condensed by the condensing pipe to the evaporator pipe.

In some implementations, the refrigerator may further include at least one of a first heat transfer plate interposed between the condensing pipe and the first inner case, or a second heat transfer plate interposed between the evaporator pipe and the second inner case. In some implementations, the refrigerator may further include: a first backward flow preventer pipe that is disposed at an inlet end of the condensing pipe and that has an upwardly convex shape, and a second backward flow preventer pipe that is disposed at an inlet end of the evaporator pipe and that has a downwardly convex shape.

In some implementations, the condensing pipe may be arranged vertically above the first inner case. In some implementations, one or both of the condensing pipe and the evaporator pipe may define a meander line that is bent one or more times. In some implementations, the evaporator pipe may define a meander line that is bent one or more times and that surrounds portions of both side surfaces of the second inner case and portions of a rear surface of the second inner case.

In some examples, the evaporator pipe may extend in a horizontal direction along a first side surface of the second inner case, the rear surface of the second inner case, and a second side surface of the second inner case. The evaporator pipe may be bent in a vertical direction from a position at the second side surface of the second inner case and extend in the horizontal direction along the second side surface, the rear surface of the second inner case, and the first side surface of the second inner case. In some examples, the inlet of the evaporator pipe may be arranged at a lower end of the second inner case, and the outlet of the evaporator pipe may be arranged at an upper end of the second inner case.

In some implementations, the cool air storage unit may include a housing that defines an external appearance of the cool air storage unit and that is configured to store a phase change material. In some implementations, the refrigerator may further include a holder configured to couple the cool air storage unit to a ceiling of the first inner case, where the holder defines a through hole that exposes a surface of the housing to the freezing compartment.

In some implementations, the housing may include a protrusion that extends downwardly and that protrudes toward the freezing compartment. In some examples, the first inner case may define a discharge outlet configured to supply cool air to the freezing compartment, and the protrusion may be disposed in a range from the discharge outlet. In some examples, the discharge outlet may be defined at a rear surface of the first inner case. In some examples, the protrusion may include a first protrusion disposed at a left side of the housing and a second protrusion disposed at a right side of the housing and spaced apart from the first protrusion.

In some implementations, the phase change material is a mixture including water, urea, and aluminum silicate. In some examples, a weight percentage of the urea may be in a range of 2% to 7% of the mixture. In some examples, a weight percentage of the aluminum silicate may be in a range of 0.5% to 2% of the mixture.

In some implementations, the phase change material may be configured to change a phase to solid or liquid in the freezing compartment.

In some implementations, a refrigerating compartment may be maintained at a temperature lower than the external air even in case of a power failure to thereby keep food fresh in the refrigerating compartment.

In some implementations, the cool air may be accumulated in the refrigerator during normal operation and the accumulated cool air may be used in case of a power failure to thereby keep food fresh in a storage compartment.

DETAILED DESCRIPTION

Figure 1:
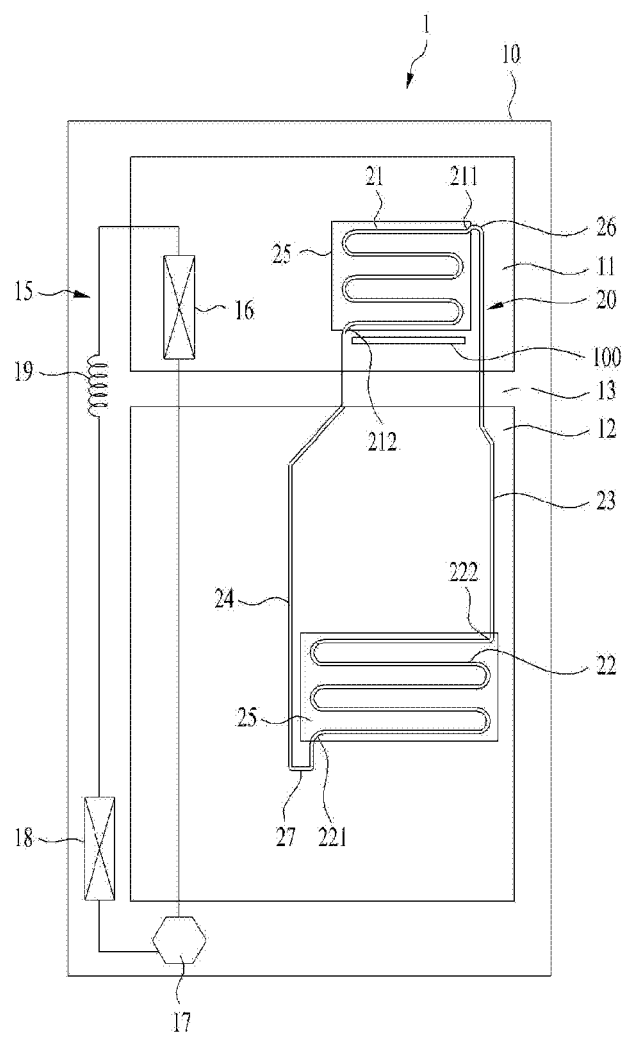
FIG. 1 is a conceptual view illustrating an example refrigerator including an example thermal siphon unit.

Reference will now be made in detail to one or more implementations of the present disclosure, examples of which are illustrated in the accompanying drawings.

For clarification and convenience of description, size and shape of each element shown in the drawings may be enlarged, or downsized. Also, the terms defined particularly considering elements and operation of the present disclosure may be modified depending on intention of a user or person skilled in the art or practices. These terms used herein should be understood not simply by the actual terms used but by the meaning lying within and the description disclosed herein.

FIG. 1 is a conceptual view illustrating an example refrigerator including an example thermal siphon unit.

Referring to FIG. 1, the refrigerator 1 may include a main body 10 that defines a storage space therein, a partition wall 13 that partitions the storage space into a refrigerating compartment 12 and a freezing compartment 11, a cooling cycle 15 configured to cool the refrigerating compartment 12 and the freezing compartment 11, and a thermal siphon unit 20 for allowing the cool air of the freezing compartment to be transferred to the refrigerating compartment using a thermal siphon phenomenon. The cool air of the freezing compartment 11 may be transferred to the refrigerating compartment through the thermal siphon unit 20, whereby load of the refrigerating compartment may be minimized or reduced.

In some implementations, the cooling cycle 15 may include a compressor 17 for compressing a refrigerant of low temperature and low pressure to a supersaturated vapor refrigerant of high temperature and high pressure, a condenser 18 arranged at an outlet of the compressor 17, condensing the supersaturated vapor refrigerant of high temperature and high pressure to a saturated liquid refrigerant of high temperature and high pressure, an expansion device 19 for expanding the saturated liquid refrigerant of high temperature and high pressure to a 2-phase refrigerant of low temperature and low pressure, and an evaporator 16 arranged at an outlet of the expansion device 19, evaporating the 2-phase refrigerant of low temperature and low pressure to a vapor refrigerant of low temperature and low pressure.

The compressor 17, the condenser 18, the expansion device 19 and the evaporator 16 may be connected by a refrigerant path (e.g., pipe), and the refrigerant may be circulated along the refrigerant path.

In some implementations, the evaporator 16 may be arranged at a rear side of the freezing compartment 11 and supply the cool air generated therein to the freezing compartment 11 and the refrigerating compartment 12. To maintain the refrigerating compartment and the freezing compartment at a set temperature, the cooling cycle may be operated continuously. To this end, a power should be supplied to the compressor. If a power failure occurs, since the power supply to the compressor is stopped, the cooling cycle may not be operated. As a result, temperatures of the refrigerating compartment and the freezing compartment may increase.

In some examples, since the temperature of the refrigerating compartment is higher than that of the freezing compartment, the temperature of the refrigerating compartment may increase more quickly. In these examples, in a state that the cooling cycle 15 is not operated due to the power failure, the cool air of the freezing compartment 11 may be transferred to the refrigerating compartment by the thermal siphon unit 20 to minimize an increase of load of the refrigerating compartment.

In some implementations, the thermal siphon unit 20 may include a condensing pipe 21 arranged at a sidewall, which defines the freezing compartment 11, liquefying a working fluid flowing therein, an evaporator pipe 22 arranged at a wall, which defines the refrigerating compartment 12, vaporizing a working fluid flowing therein, a first connection pipe 23 connecting an outlet 222 of the evaporator pipe with an inlet 211 of the condensing pipe to flow the working fluid evaporated by the evaporator pipe 22 to the condensing pipe 21, and a second connection pipe 24 connecting an outlet 212 of the condensing pipe with an inlet 221 of the evaporator pipe to flow the working fluid liquefied by the condensing pipe 21 to the evaporator pipe 22.

The condensing pipe 21, the evaporator pipe 22, the first connection pipe 23 and the second connection pipe 24 may define one closed loop to allow the working fluid to circulate in the closed loop. The thermal siphon unit may be made of one pipe, or may be made of a plurality of pipes connected with one another.

In some examples, the condensing pipe 21 may be located at the freezing compartment 11 and may condense the working fluid of a gaseous state to a liquid state in the condensing pipe. That is, the condensing pipe 21 may be regarded as a portion that emits heat absorbed in the working fluid to the freezing compartment 11.

In some implementations, the condensing pipe 21 may be curved up and down several times to widen a heat-exchange area, and a heat transfer plate 25 may be interposed between the wall of the freezing compartment 11 and the condensing pipe 21. The heat transfer plate 25 may be made of a metal material having high thermal conductive rate. The working fluid is converted from the gaseous state to the liquid state in the condensing pipe 21 and then flows to the second connection pipe 24 by the gravity. The inlet 211 of the condensing pipe may be located above the outlet 212 of the condensing pipe. Since the condensing pipe 21 has a structure curved in a vertical direction several times, the working fluid entering the inlet 211 of the condensing pipe flows along the condensing pipe 21 and moves to the outlet 213 of the condensing pipe.

In some implementations, a first backward flow preventer pipe 26 for preventing the working fluid of the liquid state flowing along the condensing pipe 21 from backward flowing to the first connection pipe 23 may further be formed at the inlet 211 of the condensing pipe. In more detail, the first backward flow preventer pipe 26 may be defined as a curved portion where a part of the condensing pipe 21 is rounded to be upwardly convex at the inlet 211 of the condensing pipe. Therefore, the working fluid condensed at the liquid state in the condensing pipe 21 is prevented from backward flowing to the first connection pipe 23 by the first backward flow preventer pipe 26.

The condensing pipe 21 may be arranged at a left side or a right side, which defines the freezing compartment 11, and may be arranged on an inner surface or outer surface of the freezing compartment 11.

In some implementations, the evaporator pipe 22 is located at the refrigerating compartment 12, is a portion where the working fluid of the liquid state is phase-changed to a gaseous state by absorbing heat from the cool air of the refrigerating compartment. In the same manner as the condensing pipe 21, the evaporator pipe 22 may be curved several times to widen a heat transfer area (e.g., meander line). Also, the heat transfer plate 25 may be interposed between the evaporator pipe 22 and the wall of the refrigerating compartment 12 to increase the heat transfer area and heat exchange capability. That is, the evaporator pipe 22 may be adhered to a first surface of the heat transfer plate 25, and the wall of the refrigerating compartment 12 may be adhered to a second surface of the heat transfer plate 25. The first surface and the second surface may be defined as those opposite to each other.

Since the working fluid vaporized by absorbing heat from the cool air of the refrigerating compartment is characterized to ascend due to its small specific gravity, the working fluid moves to the first connection pipe 23 by passing through the evaporator pipe 22. As shown, in some implementations, the inlet 221 of the evaporator pipe may be located at a position lower than the outlet 222 of the evaporator. A second backward flow preventer pipe 27 may further be formed at the inlet 221 of the evaporator pipe 22 to prevent the working fluid vaporized in the evaporator pipe 22 from backward flowing to the second connection pipe 24. That is, the second backward flow preventer pipe 27 is a portion where a part of the evaporator pipe 22 is rounded to be downwardly convex at the inlet 221 of the evaporator pipe, and blocks the working fluid of the gaseous state from descending and flowing to the second connection pipe 24.

Also, since the working fluid of liquid state dropped from the condensing pipe 21 is stagnant on the bottom of the second backward flow preventer pipe 27, the working fluid vaporized from the evaporator pipe 22 pushes out the working fluid of the liquid state, whereby the working fluid cannot move to the second connection pipe 24.

The second connection pipe 24 is a path where the working fluid of the liquid state liquefied by the condensing pipe 21 flows, and the first connection pipe 23 is a path where the working fluid of the gaseous state vaporized by the evaporator pipe 22 flows.

The working fluid is vaporized while flowing along the evaporator pipe 22 and then ascends along the first connection pipe 23, and enters the condensing pipe 21 and then is condensed at the liquid state. Then, the working fluid is dropped along the second connection pipe 24 and then enters the evaporator pipe 22. This circulation step of the working fluid may prevent the temperature of the refrigerating compartment from rapidly increasing due to load of the refrigerating compartment, which is transferred to the freezing compartment 11.

A cool air storage unit 100 is provided in the freezing compartment 11 to accumulate the cool air therein. The cool air storage unit 100 is characterized in that it is phase-changed to a solid state at a low temperature and phase-changed to a liquid state in accordance with increase of the temperature.

The cool air storage unit 100 is arranged such that its one surface is exposed to the freezing compartment 11, whereby the cool air storage unit 100 may be cooled in accordance with heat exchange with the freezing compartment 11.

In a power failure state that electricity is not supplied to the refrigerator, the cool air is supplied to the freezing compartment in accordance with increase of the temperature of the cool air storage unit 100 that has accumulated the cool air therein. The working fluid flowing in the condensing pipe 21 is cooled in accordance with decrease of the peripheral temperature caused by the cool air storage unit 100, whereby heat may move through the thermal siphon unit 20. Therefore, the cool air of the freezing compartment 11 move to the refrigerating compartment 12, whereby food may be prevented from going bad due to rapid increase of the temperature in the refrigerating compartment 12.

Figure 2:
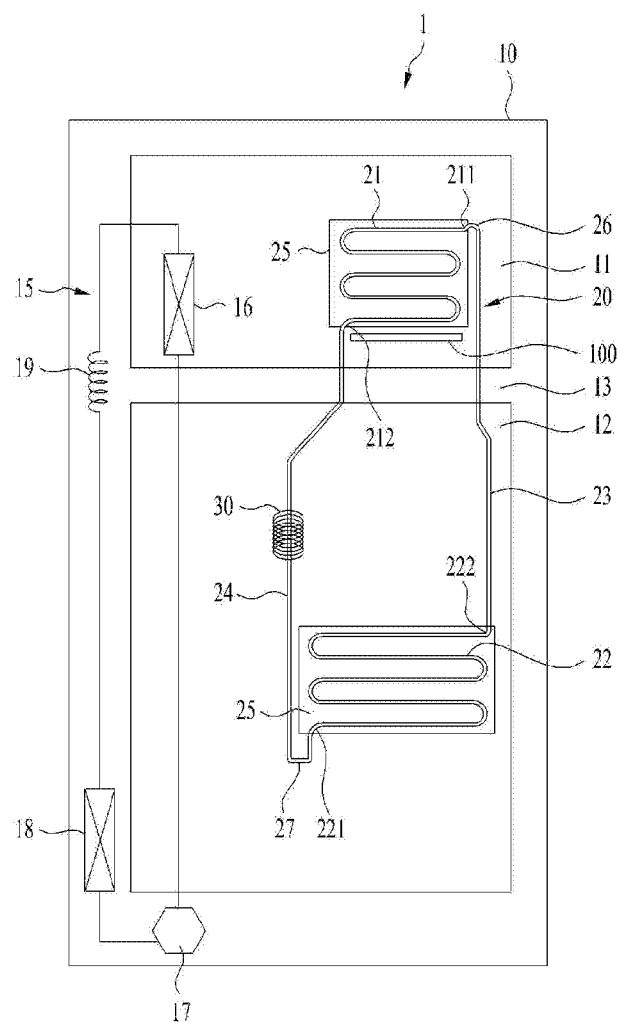
FIG. 2 is a conceptual view illustrating an example refrigerator including an example thermal siphon unit.

FIG. 2 is a conceptual view illustrating another example refrigerator including an example thermal siphon unit.

FIG. 2 is different from FIG. 1 in that the thermal siphon unit 20 includes a heating member 30. Since other elements of FIG. 2 may correspond to those of FIG. 1, their repeated description will be omitted.

The thermal siphon unit 20 may include a condensing pipe 21 arranged at a sidewall, which defines the freezing compartment 11, liquefying a working fluid flowing therein, an evaporator pipe 22 arranged at a wall, which defines the refrigerating compartment 12, vaporizing a working fluid flowing therein, a first connection pipe 23 connecting an outlet 222 of the evaporator pipe with an inlet 211 of the condensing pipe to flow the working fluid evaporated by the evaporator pipe 22 to the condensing pipe 21, a second connection pipe 24 connecting an outlet 212 of the condensing pipe with an inlet 221 of the evaporator pipe to flow the working fluid liquefied by the condensing pipe 21 to the evaporator pipe 22, and a heating member 30 provided to be wound on an outer circumference surface of the second connection pipe 24.

The heating member 30 may include a heater that may be heated by electricity. That is, if electricity is supplied to the heating member 30, the heating member 30 may heat the working fluid which passes through the second connection pipe 24 while emitting heat. On the other hand, if electricity is not supplied to the heating member 30, the heating member 30 cannot heat the working fluid which passes through the second connection pipe 24 while failing to emit heat. The heating member 30 may have a coil shape to be arranged to wind the outside of the second connection pipe 24 several times.

In a power failure state that electricity is not supplied to the refrigerator, the second connection pipe 24 is a path where the working fluid of the liquid state liquefied by the condensing pipe 21 flows, and the first connection pipe 23 is a path where the working fluid of the gaseous state vaporized by the evaporator pipe 22 flows.

The working fluid is vaporized while flowing along the evaporator pipe 22 and then ascends along the first connection pipe 23, and enters the condensing pipe 21 and then is condensed at the liquid state. Then, the working fluid is dropped along the second connection pipe 24 and then enters the evaporator pipe 22. This circulation step of the working fluid is performed when the operation of the cooling cycle 15 is stopped, and may prevent the temperature of the refrigerating compartment from rapidly increasing due to load of the refrigerating compartment, which is transferred to the freezing compartment 11.

In some implementations, when the cooling cycle 15 is normally operated by normal electricity supply to the refrigerator, the heating member 30 is operated to block circulation of the working fluid. That is, the heating member 30 vaporizes the working fluid which is dropped along the inside of the second connection pipe 24 to allow the working fluid of the gaseous state, which is ascending, to block the working fluid of the liquid state from being dropped.

The heating member 30 according to another implementation may be located in the middle of the circulation structure of the thermal siphon unit 20. In more detail, the heating member 30 may be located at a random point of the second connection pipe 24, where the working fluid of the liquid state discharged from the condensing pipe 21 downwardly flows by the self-load. For example, the heating member 30 may be provided at a position closer to the evaporator pipe 22 than the condensing pipe 21. In some implementations, the heating member 30 may be arranged at a portion adjacent to the second backward flow preventer pipe 27 if possible to vaporize the working fluid of the liquid state stagnant in the lower end of the second connection pipe 24. If the heating member 30 is provided in the middle of the second connection pipe 24, heat is applied to the working fluid of the liquid state, which is being dropped, whereby the working fluid may not be vaporized sufficiently.

For another example, the heating member 30 may be provided at a point spaced apart from a sidewall or a rear wall of the refrigerating compartment 12 of the second connection pipe 24. If the heating member 30 is operated, a temperature of a portion adjacent to the heating member 30 may increase. If the heating member 30 is provided to be in contact with the sidewall or the rear wall of the refrigerating compartment 12, the heating member 30 may increase load of the refrigerating compartment 12 by supplying heat to the refrigerating compartment 12. Therefore, the heating member 30 may be provided at a point spaced apart from any one of the sidewall and the rear wall of the refrigerating compartment 12. The working fluid vaporized by the heating member 30 generates a resistance pressure that pushes up the liquid working fluid dropped from the condensing pipe 21 while ascending along the second connection pipe 24. The liquid working fluid is not dropped any more by the resistance pressure, whereby circulation of the working fluid is not performed. In this case, heat exchange between the cool air of the refrigerating compartment and the cool air of the freezing compartment is not generated.

The heating member 30 may be a coil heater provided to wind the outer circumference surface of the second connection pipe 24.

Figure 3:
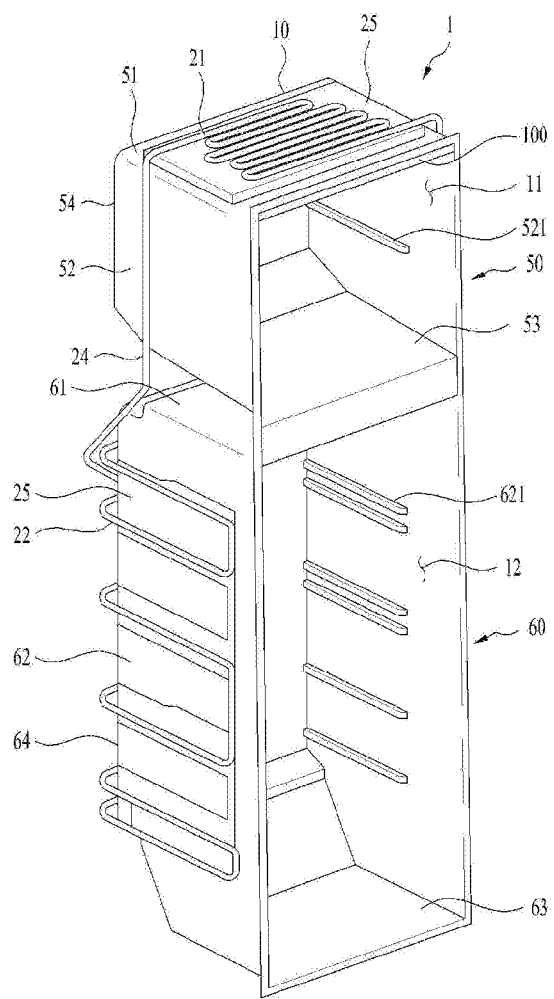
FIG. 3 is a perspective view illustrating an example refrigerator including an example thermal siphon unit.
Figure 4:
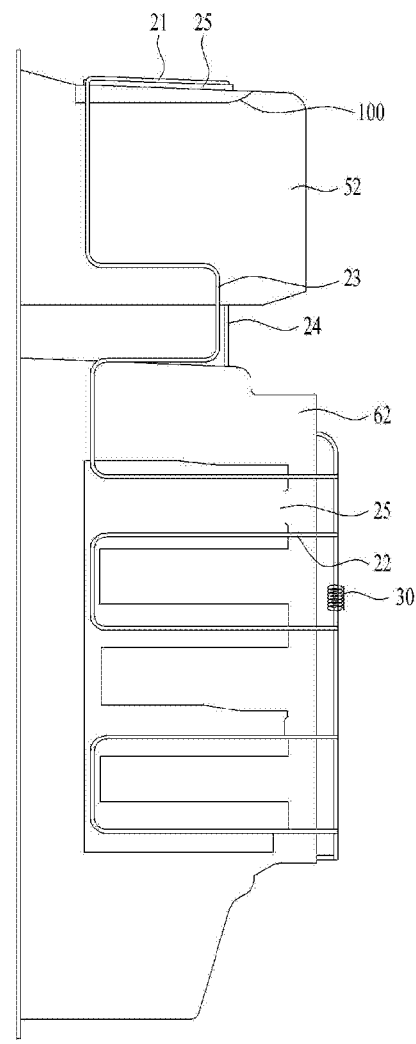
FIG. 4 is a right side view illustrating the refrigerator of FIG. 3.
Figure 5:
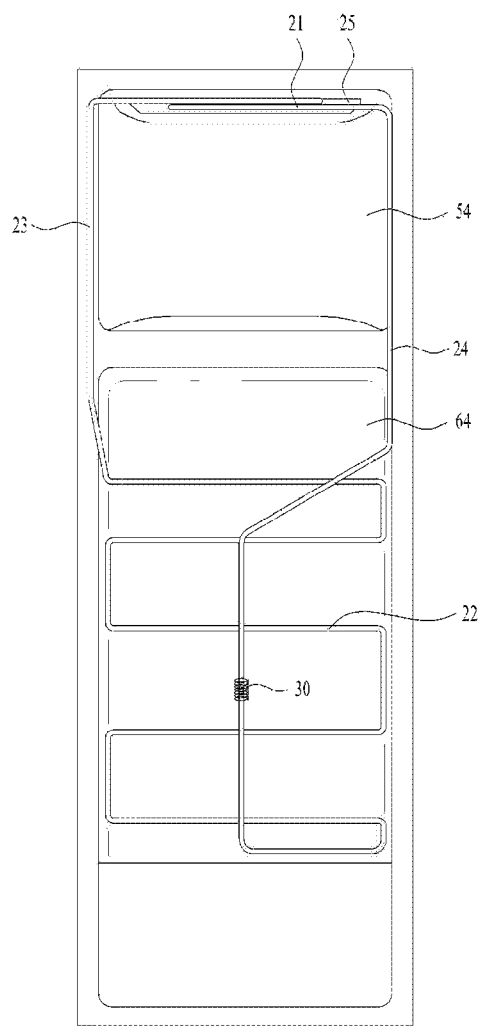
FIG. 5 is a rear view illustrating the refrigerator of FIG. 3.
Figure 6:
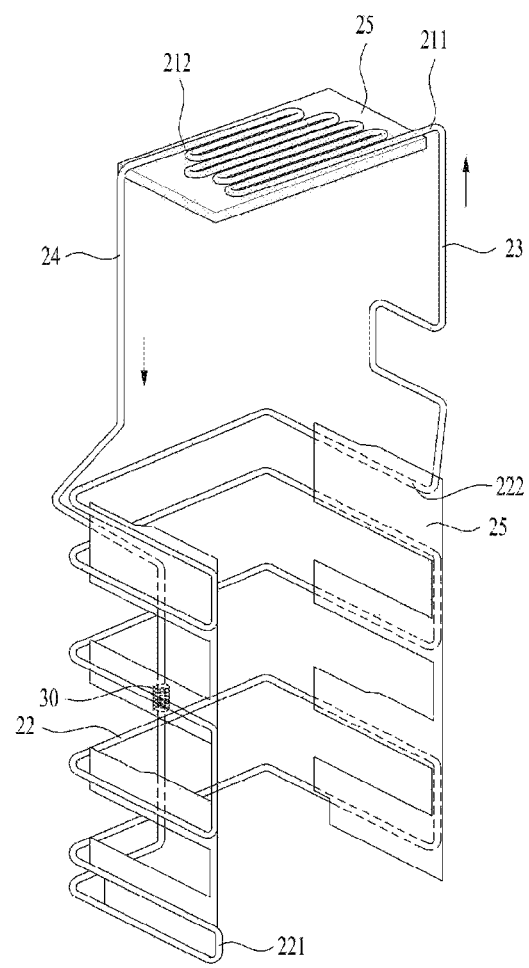
FIG. 6 is a perspective view illustrating an example of a main part of the thermal siphon unit in FIG. 3.

FIG. 3 is a perspective view illustrating an example refrigerator including an example thermal siphon unit, FIG. 4 is a right side view illustrating the refrigerator of FIG. 3, FIG. 5 is a rear view illustrating the refrigerator of FIG. 3, and FIG. 6 is a perspective view illustrating an example of a main part of the thermal siphon unit in FIG. 3.

Referring to FIGS. 3 to 6, in the thermal siphon unit 20 according to another implementation, the condensing pipe 21 may be arranged on an upper surface of the freezing compartment 11, and may be arranged in curved shape meandered in a horizontal direction. The condensing pipe 21 may be attached to the outer surface of the freezing compartment 11.

Also, a heat transfer plate 25, which may transfer heat, is arranged between the condensing pipe 21 and an inner case 50 of the freezing compartment. The cool air storage unit 100 is provided on the inner surface of the freezing compartment at the ceiling of the inner case 50 of the freezing compartment. The cool air storage unit 100 is provided to accumulate the cool air of the freezing compartment during normal operation of the refrigerator 1 and then supply the cool air to the freezing compartment 11 if a power failure occurs.

In a state that electricity is not supplied to the refrigerator, since the compressor is not driven, the cool air is not supplied by the cooling cycle. Therefore, the temperature of the refrigerating compartment or the freezing compartment is increased by external factor. The cool air storage unit 100 substantially has the same temperature as that of the freezing compartment 11, and then absorbs heat of the freezing compartment 11 if the temperature of the freezing compartment 11 increases, thereby preventing the temperature of the freezing compartment 11 from rapidly increasing.

In some implementations, the cool air storage unit 100 may serve to condense the working fluid of the gaseous state, which enters the condensing pipe 21 in a power failure state.

In some implementations, the main body 10 may include an inner case 50 of the freezing compartment, which forms the freezing compartment 11, and an inner case 60 of the refrigerating compartment, which is arranged below the inner case of the freezing compartment and forms the refrigerating compartment 12. In some examples, the inner case 50 may be a first inner case that defines the freezing compartment 11, and the inner case 60 may be a second inner case that defines the refrigerating compartment 12.

In some implementations, the inner case 50 of the freezing compartment may have a hexahedral box shape, having an opened front surface to define the freezing compartment 11. That is, the inner case 50 of the freezing compartment may include an upper surface 51, a pair of sides 52 extended from both ends of the upper surface 51 to a lower side thereof, a rear surface 54 extended from a rear end of the upper surface 51 to a lower side thereof, and a lower surface 53 connecting the pair of sides 52 with the rear surface 54. A first protrusion 521 for supporting a rack may be formed on an inner surface of the pair of sides 52. The first protrusion 521 may be formed longitudinally in a forward-backward direction, and a plurality of first protrusions 521 may be arranged to be spaced apart from one another in an up and down direction.

In some implementations, the inner case 60 of the refrigerating compartment may have a similar hexahedral box shape as the shape of the inner case 50 of the freezing compartment except an up and down length.

For example, the inner case 60 of the refrigerating compartment may include an upper surface 61, a pair of sides 62 that extend from both ends of the upper surface 61, a lower surface 63 that connects lower ends of the pair of sides 62, a rear surface 64 that extends from a rear end of the upper surface 61 to a lower side thereof, and a lower surface 63 that connects the pair of sides 62 with the rear surface 64.

A second protrusion 621 for supporting a rack may be formed on an inner surface of the pair of sides 62.

A first backward flow preventer pipe suggested in the first implementation may be formed at the inlet 211 of the condensing pipe, and a second backward flow preventer pipe suggested in the first implementation may be formed at the inlet 221 of the evaporator pipe.

The heating member 30 may be attached to a random point of the second connection pipe 24, and may be formed at a point close to the lower end of the second connection pipe.

In some implementations, the evaporator pipe 22 may be arranged in a shape different from the structure of the evaporator pipe suggested in the first implementation.

The second connection pipe 24 is extended to the lower end of the inner case 60 of the refrigerating compartment, and is extended to be bent from the lower end of the inner case 60 to surround one side, a rear surface and the other side of the inner case 60.

The evaporator pipe 22 may be provided in a structure extended to be bent to surround the other side, the rear surface and one side of the inner case 60 by being bent to the rear after being upwardly bent from a front end of the other side of the inner case 60. The evaporator pipe 22 may be extended in a zigzag shape reciprocating from one side of the inner case 60 to the other side several times, or may be extended from the lower end of the inner case 60 to the upper end thereof. The first connection pipe 23 is extended from an upper end at the side of the inner case 60 to the inlet 211 of the condensing pipe.

Also, the second connection pipe 24 may downwardly be extended along the side of the inner case 60 and then downwardly extended along the center of the rear surface of the inner case 60.

Also, the heat transfer plate 25 may be attached between the evaporator pipe 22 and the inner case 60 of the refrigerating compartment. The second protrusion 621 formed on the inner surface of the inner case 60 of the refrigerating compartment may be formed at a point where the evaporator pipe is located, by interposing the heat transfer plate adjacent thereto up and down.

Figure 7:
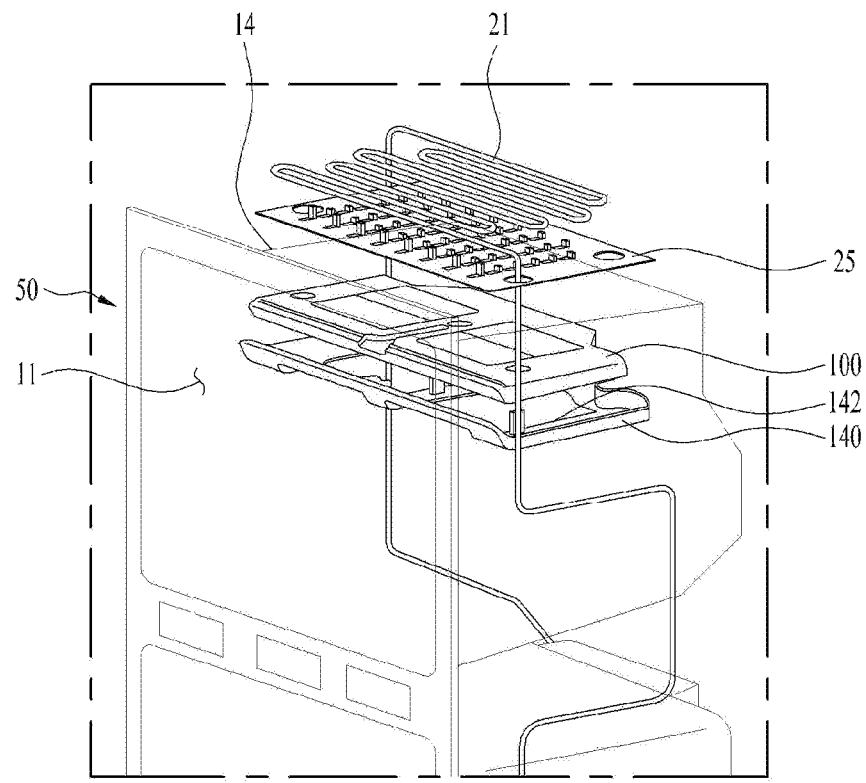
FIG. 7 is a view illustrating an example of an upper main part of an example thermal siphon unit.

FIG. 7 is a view illustrating an example of an upper main part of an example thermal siphon unit.

Referring to FIG. 7, the heat transfer plate 25 is provided below the condensing pipe 21 to improve heat exchange efficiency of the condensing pipe 21.

The heat transfer plate 25 is provided at an outer sidewall of the inner case 50 of the freezing compartment. One surface of the heat transfer plate 25 may be flat to be in surface contact with the surface of the inner case 50 of the freezing compartment. The other surface of the heat transfer plate 25 may have a stereoscopic shape to be matched with the shape of the condensing pipe 21 such that the portion which is in contact with the condensing pipe 21 may be increased.

That is, the other surface of the heat transfer plate 25 may be provided with a portion arranged to surround a pipe shape of the condensing pipe 21 or protruded to be adjacent to the pipe shape.

The inner case 50 of the freezing compartment is arranged between the cool air storage unit 100 and the heat transfer plate 25, whereby the cool air storage unit 100 may perform heat exchange with the heat transfer plate 25 by interposing the inner case 50 of the freezing compartment therebetween.

A holder 140, which may fix the cool air storage unit 100 to the ceiling of the inner case 50 of the freezing compartment, is arranged below the cool air storage unit 100. A lower portion of the cool air storage unit 100 is mounted in the holder 140, whereby the cool air storage unit 100 may be fixed to the ceiling of the freezing compartment.

A through hole 142 is formed in the holder such that the cool air storage unit 100 may be exposed to the freezing compartment. The through hole 142 is formed respectively at left and right sides of the holder 140, whereby left and right sides of the cool air storage unit 100 may be exposed to the freezing compartment 11.

Therefore, since the cool air storage unit 100 is directly heat-exchanged with the freezing compartment 11, if the temperature of the cool air storage unit 100 is higher than that of the freezing compartment 11, the cool air storage unit 100 may be cooled. If the temperature of the cool air storage unit 100 is lower than that of the freezing compartment 11, the freezing compartment 11 may be cooled by the cool air storage unit 100.

The holder 140 may have a structure that may corner of a corner of the cool air storage unit 100. The holder 140 is provided with a rib respectively formed at both sides of the through hole 142, whereby the ribs are in contact with the cool air storage unit 100 to prevent the cool air storage unit 100 from being detached from the freezing compartment 11.

Figure 8:
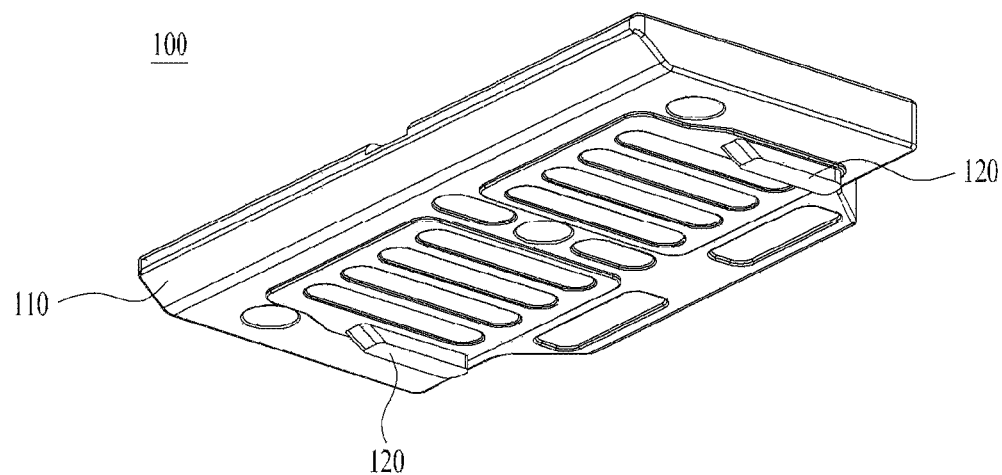
FIG. 8 is a view illustrating a lower side of an example cooling air storage unit.

FIG. 8 is a view illustrating an example of a lower side of an example cooling air storage unit.

Referring to FIG. 8, the cool air storage unit includes a housing 110 forming an external appearance, and a phase change material stored in the housing 110.

The phase change material is a mixture material of water, urea and aluminum silicate, and may form a phase change from solid to liquid or from liquid to solid in accordance with a temperature change of the freezing compartment. The phase change material may absorb more energy when a phase is changed from solid to liquid while maintaining a liquid state or solid state than when a temperature is changed. Therefore, the temperature of the freezing compartment may be prevented from being rapidly increased at a temperature band where a phase change is made.

The housing 110 is provided with a protrusion 120 protruded downwardly. The protrusion 120 may include a first protrusion protruded at a left portion of the housing and a second protrusion protruded at a right portion of the housing. Each of the first protrusion and the second protrusion is arranged at the position where the through hole 142 is formed in the holder 140, whereby each of the first and second protrusions may be exposed into the freezing compartment 11.

The first protrusion and the second protrusion are arranged to be spaced apart from each other, whereby the respective protrusions are arranged at their respective positions different from each other in the freezing compartment 11.

A receiving space in which the phase change material may be received is provided inside the first and second protrusions along the protruded shapes of the first protrusion and the second protrusion. That is, the phase change material is arranged inside the first protrusion and the second protrusion, whereby the phase change material may be located, at the portion where the first protrusion and the second protrusion are located, to be lower than the other portion of the housing 110.

The protrusion 120 is formed to have a width which gradually becomes narrow from the upper side to the lower side, whereby the phase change material is received in the lower side of the protrusion 120 at a smaller amount than that of the upper side.

The housing 110 may be made of a material which is not deformed greatly, so that the phase change material may be kept in the housing 110 even in a state that the phase change material forms a liquid state. This is because that the phase change material may be phase-changed to liquid or solid inside the housing 110.

The housing 110 may have a bottom portion, which is flat, to increase an area where the phase change material kept in the housing may be heat-exchanged with the freezing compartment 11 in contact with the freezing compartment 11. That is, the housing 110 is installed in the ceiling of the freezing compartment 11, wherein the upper surface of the housing 110 is installed in the ceiling of the inner case 50 of the freezing compartment 11 and the lower surface of the housing 110 is exposed to the freezing compartment 11, whereby the phase change material may be heat-exchanged with the freezing compartment 11.

Figure 9:
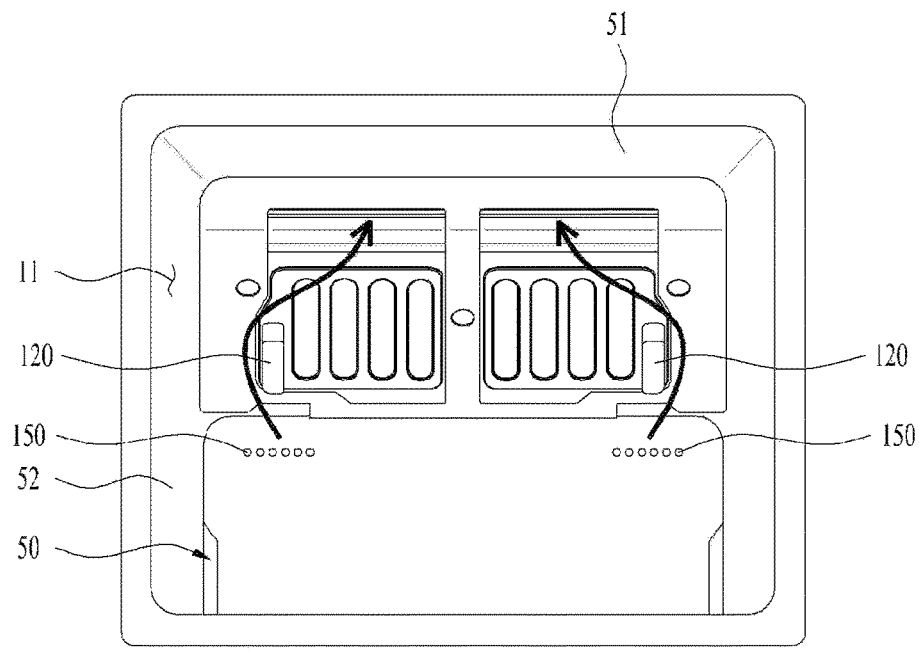
FIG. 9 is a view briefly illustrating an inside of an example freezing compartment.

FIG. 9 is a view briefly illustrating an inside of an example freezing compartment.

Referring to FIG. 9, a discharge outlet 150 for discharging the cool air to the freezing compartment 11 is formed on the rear surface of the inner case 50 of the freezing compartment.

The discharge outlet 150 is a path where the cool air supplied by the evaporator of the cooling cycle may be guided to the freezing compartment 11. Since the air cooled by the evaporator is discharged out through the discharge outlet 150, the position adjacent to the discharge outlet 150 or the path of the cool air moved by the discharge outlet 150 may have a temperature lowered than that of the other portion of the freezing compartment 11.

In the present disclosure, the protrusion 120 is arranged at the position adjacent to the discharge outlet 150, whereby the protrusion 120 may be arranged at a portion of the freezing compartment 11, having a relatively low temperature.

In some implementations, the protrusion 120 may be arranged at the position where the cool air discharged through the discharge outlet 150 moves.

Referring to FIG. 9, the cool air discharged through the left discharge outlet 150 moves toward the protrusion 120 clockwise. The cool air discharged through the right discharge outlet 150 moves toward the protrusion 120 counterclockwise.

That is, the cool air discharged into the freezing compartment 11 through the discharge outlet 150 may be heat-exchanged with the other portion of the freezing compartment and thus be in contact with the protrusion 120 before the temperature increases. Therefore, the protrusion 120 may be maintained at a temperature lower than that of the other portion of the freezing compartment 11.

Figure 10:
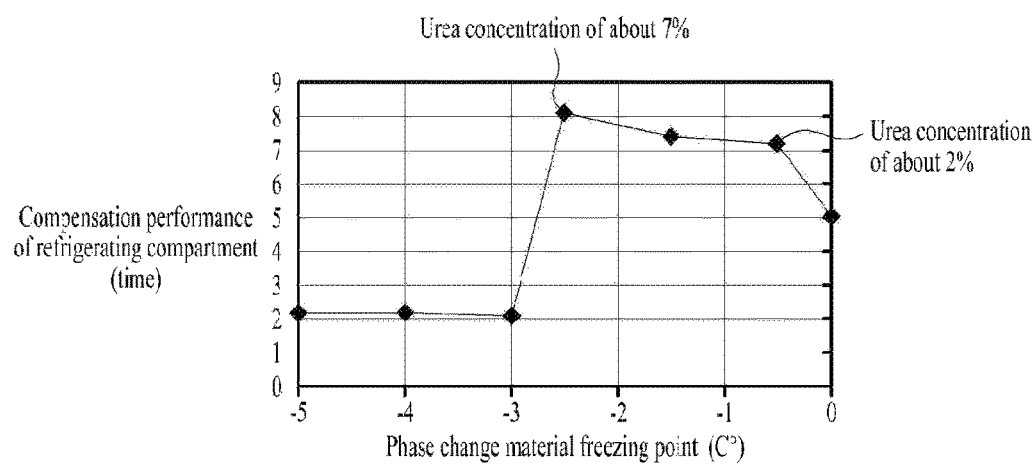
FIG. 10 is an example graph showing power failure compensation times corresponding to example concentrations of urea in a phase change material.

FIG. 10 is a graph showing examples of power failure compensation times corresponding to example element concentrations in a phase change material.

In some implementations, referring to FIG. 10, the phase change material may be a mixture including urea, water, and a nucleating agent (e.g., aluminum silicate).

As a concentration of urea in the phase change material increases, a freezing point of the phase change material may increase. If the freezing point increases over a threshold temperature, since the phase change material may not be frozen well in the freezing compartment, the cool air may not be accumulated sufficiently in the cool air storage unit 100. In some examples, the concentration may refer to a weight percentage of a weight of a component, such as urea and aluminum silicate, to a total weight of the mixture.

For example, as shown in FIG. 10, in a state that a concentration of urea in the phase change material is mixed at 2% to 7%, approximately, power failure compensation performance of the refrigerating compartment may be maintained for 7 hours or more. In some examples, the power failure compensation performance of the refrigerating compartment may refer to the time required until the temperature of the refrigerating compartment is increased as much as a set temperature. That is, since the temperature of the refrigerating compartment is not increased as much as a set temperature even in a power failure state where electricity is not supplied to the refrigerator, food may be kept in a fresh state in the refrigerator without going bad.

Since the cool air by the cooling cycle is not supplied to the freezing compartment and the refrigerating compartment in a power failure state that electricity is not supplied to the refrigerator, the temperature increases. Typically, since it is general that the freezing compartment is set to a temperature lower than that of the refrigerating compartment, food kept in the refrigerating compartment may easily go bad. Therefore, in the present disclosure, the cool air accumulated in the cool air storage unit 100 as well as the cool air of the freezing compartment moves to the refrigerating compartment 12 through the thermal siphon unit 20, thereby blocking temperature increase of the refrigerating compartment 12.

Referring to FIG. 10, the freezing point of the phase change material is lowered as the concentration of the urea becomes high. In some examples, if the concentration of urea is increased to 7% or more, the amount of the cool air accumulated in the cool air storage unit 100 may be reduced. As a result, the time that may maintain performance of the refrigerating compartment during a power failure may be reduced.

In some implementations, the temperature of the refrigerating compartment may be maintained or not be increased over a threshold temperature to keep food fresh in the refrigerating compartment even though electricity is not supplied to the refrigerator for 7 hours when a concentration of urea is in a range of 2% to 7%.

Figure 11:
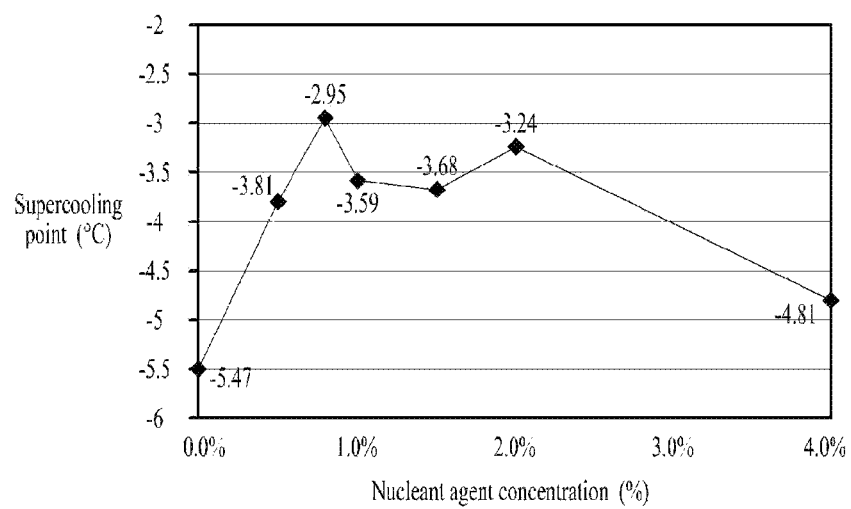
FIG. 11 illustrates an example graph and table including example supercooling points corresponding to example concentrations of aluminum silicate in a phase change material.
Figure 12:
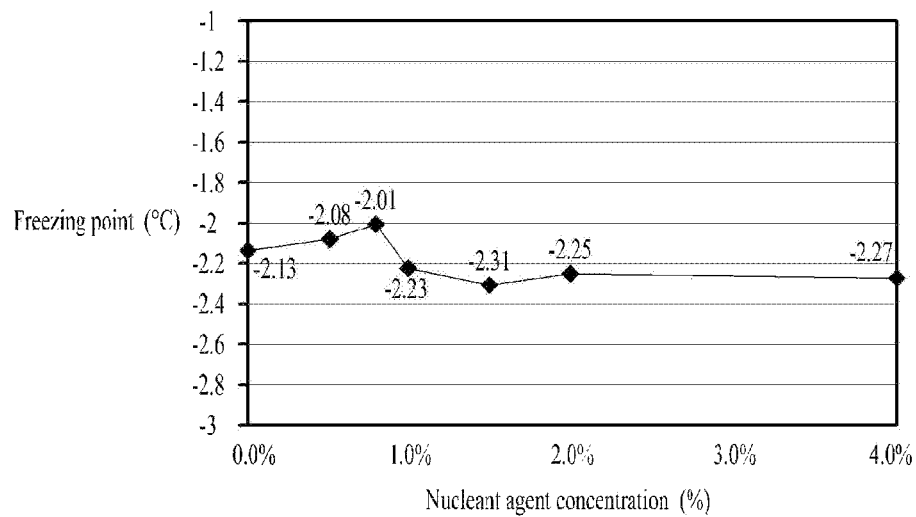
FIG. 12 illustrates an example graph and table including example freezing points corresponding to example concentrations of aluminum silicate in a phase change material.

FIG. 11 illustrates a graph and table including example supercooling points corresponding to example concentrations of aluminum silicate in a phase change material, and FIG. 12 illustrates a graph and table including example freezing points corresponding to example concentrations of aluminum silicate in a phase change material.

In some implementations, a nucleating agent may be added to facilitate generation of a solid crystal when liquid is changed to solid.

In FIGS. 11 and 12, aluminum silicate (Al2O9Si3) may be used as the nucleating agent.

Since aluminum silicate is not harmful to humans, there is no problem in that aluminum silicate is used for the cool air storage unit applied to the refrigerator.

FIG. 11 illustrates a supercooling point when aluminum silicate is mixed in the range of 0% to 4%, and FIG. 12 illustrates a freezing point when aluminum silicate is mixed in the range of 0% to 4%.

The supercooling point may refer to a temperature that starts phase change from liquid to solid.

Although a phase change material should be changed from liquid to solid at a freezing point, the material maintains a liquid state at a temperature lower than the freezing point due to various external factors and then actually changed from liquid to solid at a temperature lower than the supercooling point.

If the freezing point of the phase change material descends, the phase change from liquid to solid is performed at a lower temperature, and it is difficult to accumulate the sufficient cool air in the cool air storage unit.

In some implementations, the supercooling point may not descend to −4° or less when aluminum silicate is mixed in the range of 0.5% to 2%.

It is noted that the freezing point is not changed in the range of −2° when aluminum silicate is mixed in the range of 0.5% to 2%.

That is, when aluminum silicate is used as the nucleating agent at a specific concentration, the freezing point is not changed considerably and the supercooling point may be increased. If the supercooling point is increased, the cool air may be accumulated sufficiently in the cool air storage unit. Therefore, the temperature of the refrigerating compartment is not increased rapidly even in case of a power failure state that electricity is not supplied to the refrigerator as shown in FIG. 10, and food kept in the refrigerating compartment may be maintained for a long time without going bad.

Figure 13A:
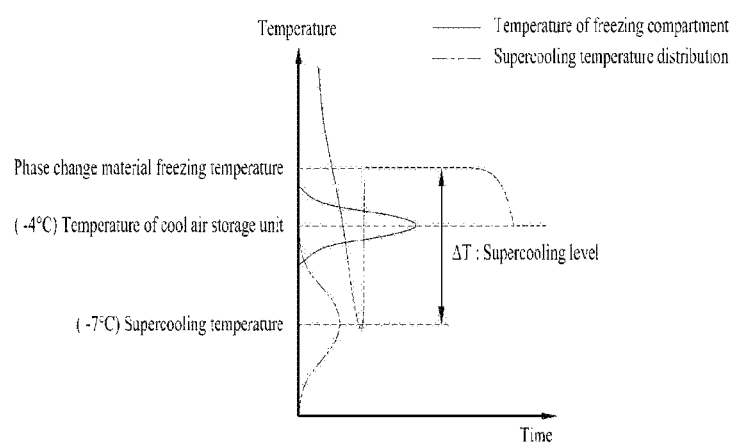
FIGS. 13A and 13B are graphs that illustrate example effects of an example refrigerator according to the present disclosure.
Figure 13B:
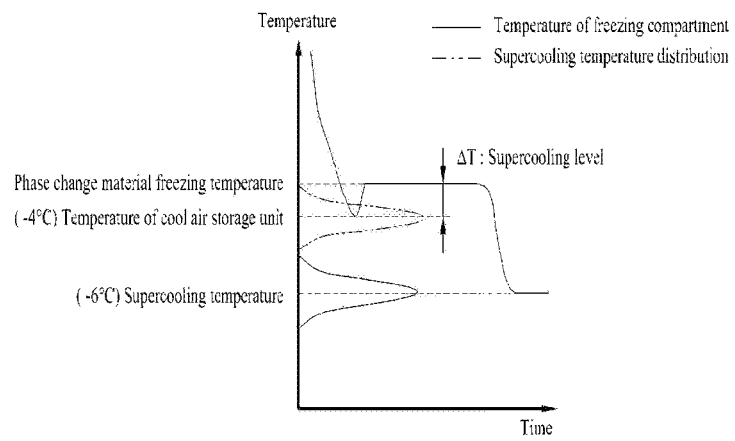

FIGS. 13A and 13B are graphs explaining effects of an example refrigerator according to the present disclosure.

In FIGS. 13A and 13B, x-axis represents time, y-axis represents a temperature, and graphs shown in FIGS. 13A and 13B each show a state that a phase change material is changed in accordance with a temperature.

FIG. 13A illustrates a state to which the characteristic of the present disclosure is not applied, and FIG. 13B illustrates a state to which the characteristic of the present disclosure is applied. That is, in FIG. 13B, the protrusion 120 of the cool air storage unit 100 is provided and the phase change material is changed in a state that water, urea and aluminum silicate are mixed.

In FIG. 13A, for phase change from liquid to solid, the phase change material should descend to reach a supercooling temperature. If the phase change material does not descend to reach a supercooling temperature, the phase change material maintains a liquid state, whereby a problem may occur in that the cool air cannot be accumulated in the cool air storage unit sufficiently.

A freezing temperature (freezing point) and a supercooling temperature of the phase change material have a temperature difference corresponding to a supercooling level.

In comparison of FIGS. 13A to 13B, by way of example, the temperature of the cool air storage unit may descend to −4° to −6° because the protrusion 120 of the cool air storage unit descends to adjoin the discharge outlet. That is, since the protrusion 120 is arranged to be extended to the discharge outlet from which the cool air is directly discharged, the temperature of the protrusion 120 may be more lowered, and the phase change material may be exposed to a lower temperature. Therefore, the phase change material may easily be phase-changed from liquid to solid even under the condition that the temperature of the freezing compartment is maintained uniformly.

In comparison of FIGS. 13A to 13B, by way of example, the supercooling temperature of the phase change material may increase from −7° to −4°. The phase change material should be cooled to a supercooling temperature or less for phase change from liquid to solid, whereby the more cool air may be accumulated. Therefore, an increase of the supercooling temperature of the phase change material may enable condensation of the phase change material from liquid to solid at a higher temperature, and the phase change material may accumulate the cool air more easily.

In some implementations, when the freezing compartment is cooled at the same temperature, the temperature of the cool air storage unit may be lowered, whereby the phase change material may be phase-changed from liquid to solid more easily.

Also, according to the present disclosure, the supercooling temperature of the phase change material ascends, whereby the phase change material may be phase-changed from liquid to solid more easily.

That is, two characteristics may be improved at the same time, whereby the phase change material may be phase-changed from liquid to solid more easily than the related art, and the cool air may easily be accumulated in the cool air storage unit so as not to rapidly increase the temperature of the refrigerating compartment even in case of a power failure.

Hereinafter, the operation of the thermal siphon unit 20 and the cool air storage unit 100 of the refrigerator 1 will be described in detail.

In some implementations, when the refrigerator is normally operated, the heating member 30 may operate to evaporate the working fluid of the liquid state, which passes through the second connection pipe 24. The working fluid of the liquid state is phase-changed to the gaseous state due to the evaporation, and the working fluid of the gaseous state ascends while upwardly pressurizing the working fluid of the liquid state dropped from the condensing pipe 21. Therefore, since the working fluid of the liquid state is not dropped any more, circulation of the thermal siphon unit 20 is stopped.

In some cases, when power supply to the heating member 30 is not performed during a power failure, the operation of the heating member 30 may be stopped. Therefore, the working fluid of the liquid state dropped from the condensing pipe 21 passes through the evaporator pipe 22, and the thermal siphon unit 20 circulates. In this circulation step, as the working fluid supplies the cool air absorbed from the freezing compartment 11 through the condensing pipe 21 to the refrigerating compartment 12, the cool air of the freezing compartment is transferred to the refrigerating compartment, whereby a load increase of the refrigerating compartment may be minimized or reduced.

In some implementations, since much power consumption may be required to always operate the heating member 30, a specific operation cycle may be set to operate the heating member 30. For example, the heating member 30 may be set to operate per certain time or certain time interval in accordance with a user pattern.

Since the cool air storage unit 100 is arranged in the freezing compartment 11 during normal operation, the cool air of the freezing compartment 11 may be accumulated to maintain the phase-changed state from liquid to solid.

In a state that a power supply to the refrigerator is not performed, the cool air accumulated in the cool air storage unit is emitted in accordance with increase of the temperature of the freezing compartment, whereby the phase change material may be phase-changed from solid to liquid.

Since the aforementioned description is equally applied to one implementation from which the heating member is excluded, the repeated description for the operation of one implementation will be omitted.

It will be apparent to those skilled in the art that the present disclosure may be implemented in other specific forms without departing from the spirit and essential characteristics of the disclosure. Thus, the above implementations are to be considered in all respects as illustrative and not restrictive. The scope of the disclosure should be determined by reasonable interpretation of the appended claims and all change which comes within the equivalent scope of the disclosure are included in the scope of the disclosure.

The invention claimed is:

1. A refrigerator comprising:
    a cabinet;
    a first inner case that defines a freezing compartment;
    a second inner case that defines a refrigerating compartment;
    a thermal siphon unit configured to carry a working fluid for heat transfer, the thermal siphon unit having a closed loop shape that includes a first part arranged at an outer side of the first inner case and a second part arranged at an outer side of the second inner case; and
    a cool air storage unit arranged in a space partitioned in the first inner case, the cool air storage unit being configured to accommodate cool air of the freezing compartment and transfer the cool air to the first part of the thermal siphon unit arranged outside of the first inner case,
    wherein the cool air storage unit includes a housing that defines an external appearance of the cool air storage unit and that is configured to store a phase change material.

2. The refrigerator according to claim 1, wherein the cool air storage unit is disposed at a ceiling of the freezing compartment and has one surface exposed to an inner space of the freezing compartment.

3. The refrigerator according to claim 1, wherein the thermal siphon unit includes:
    a condensing pipe configured to condense the working fluid by the cool air in the freezing compartment;
    an evaporator pipe configured to evaporate the working fluid by absorbing heat from cool air in the refrigerating compartment;
    a first connection pipe that connects an outlet of the evaporator pipe to an inlet of the condensing pipe and that is configured to communicate the working fluid evaporated by the evaporator pipe to the condensing pipe; and
    a second connection pipe that connects an outlet of the condensing pipe to an inlet of the evaporator pipe and that is configured to communicate the working fluid condensed by the condensing pipe to the evaporator pipe.

4. The refrigerator according to claim 3, further comprising at least one of a first heat transfer plate interposed between the condensing pipe and the first inner case, or a second heat transfer plate interposed between the evaporator pipe and the second inner case.

5. The refrigerator according to claim 3, further comprising:
    a first backward flow preventer pipe that is disposed at an inlet end of the condensing pipe and that has an upwardly convex shape; and
    a second backward flow preventer pipe that is disposed at an inlet end of the evaporator pipe and that has a downwardly convex shape.

6. The refrigerator according to claim 3, wherein the condensing pipe is arranged vertically above the first inner case.

7. The refrigerator according to claim 3, wherein one or both of the condensing pipe and the evaporator pipe define a meander line that is bent one or more times.

8. The refrigerator according to claim 3, wherein the evaporator pipe defines a meander line that is bent one or more times and that surrounds portions of both side surfaces of the second inner case and portions of a rear surface of the second inner case.

9. The refrigerator according to claim 8, wherein the evaporator pipe extends in a horizontal direction along a first side surface of the second inner case, the rear surface of the second inner case, and a second side surface of the second inner case, and
    wherein the evaporator pipe is bent in a vertical direction from a position at the second side surface of the second inner case and extends in the horizontal direction along the second side surface, the rear surface of the second inner case, and the first side surface of the second inner case.

10. The refrigerator according to claim 8, wherein the inlet of the evaporator pipe is arranged at a lower end of the second inner case, and the outlet of the evaporator pipe is arranged at an upper end of the second inner case.

11. The refrigerator according to claim 1, further comprising a holder configured to couple the cool air storage unit to a ceiling of the first inner case, the holder defining a through hole that exposes a surface of the housing to the freezing compartment.

12. The refrigerator according to claim 1, wherein the housing includes a protrusion that extends downwardly and that protrudes toward the freezing compartment.

13. The refrigerator according to claim 12, wherein the first inner case defines a discharge outlet configured to supply cool air to the freezing compartment, and
    wherein the protrusion is disposed in a range from the discharge outlet.

14. The refrigerator according to claim 13, wherein the discharge outlet is defined at a rear surface of the first inner case.

15. The refrigerator according to claim 13, wherein the protrusion includes a first protrusion disposed at a left side of the housing and a second protrusion disposed at a right side of the housing and spaced apart from the first protrusion.

16. The refrigerator according to claim 1, wherein the phase change material is a mixture including water, urea, and aluminum silicate.

17. The refrigerator according to claim 16, wherein a weight percentage of the urea is in a range of 2% to 7% of the mixture.

18. The refrigerator according to claim 16, wherein a weight percentage of the aluminum silicate is in a range of 0.5% to 2% of the mixture.

19. The refrigerator according to claim 16, wherein the phase change material is configured to change a phase to solid or liquid in the freezing compartment.

* * * * *